United States Patent
Gu et al.

(10) Patent No.: US 10,251,082 B2
(45) Date of Patent: Apr. 2, 2019

(54) MEASUREMENT CONFIGURING METHOD AND DEVICE FOR DUAL CONNECTIVITY, MEASURING METHOD AND DEVICE FOR DUAL CONNECTIVITY, SCHEDULING METHOD AND DEVICE FOR DUAL CONNECTIVITY, STORAGE MEDIUM, BASE STATION AND TERMINAL

(71) Applicant: SPREADTRUM COMMUNICATIONS (SHANGHAI) CO., LTD., Zhangjiang Shanghai (CN)

(72) Inventors: Xiangxin Gu, Zhangjiang Shanghai (CN); Yun Deng, Zhangjiang Shanghai (CN); Wei Fan, Zhangjiang Shanghai (CN)

(73) Assignee: SPREADTRUM COMMUNICATIONS (SHANGHAI) CO. LTD., Shanghai (CN)

( * ) Notice: Subject to any disclaimer, the term of this patent is extended or adjusted under 35 U.S.C. 154(b) by 0 days.

(21) Appl. No.: 15/971,372

(22) Filed: May 4, 2018

(65) Prior Publication Data

US 2018/0324624 A1  Nov. 8, 2018

(30) Foreign Application Priority Data

May 5, 2017  (CN) .......................... 2017 1 0311312

(51) Int. Cl.
*H04W 4/00* (2018.01)
*H04W 36/00* (2009.01)
(Continued)

(52) U.S. Cl.
CPC ......... *H04W 24/10* (2013.01); *H04J 11/0086* (2013.01); *H04W 76/15* (2018.02); *H04J 2211/005* (2013.01); *H04W 36/28* (2013.01)

(58) Field of Classification Search
CPC ..... H04W 24/10; H04W 76/15; H04W 36/28; H04J 11/0086; H04J 2211/005
(Continued)

(56) References Cited

U.S. PATENT DOCUMENTS

| | | | |
|---|---|---|---|
| 2015/0079910 A1* | 3/2015 | Tachikawa | H04W 24/08 455/67.11 |
| 2015/0146692 A1* | 5/2015 | Yi | H04W 36/24 370/331 |

(Continued)

*Primary Examiner* — Rafael Pérez-Gutiérrez
*Assistant Examiner* — Mark G. Pannell
(74) *Attorney, Agent, or Firm* — Cantor Colburn LLP

(57) ABSTRACT

Measurement configuring method and device for dual connectivity, measuring method and device for dual connectivity, scheduling method and device for dual connectivity, storage medium, base station and terminal are provided. The measurement configuring method includes: after an RRC connection is set up with a UE, a master base station sending master network measurement configuration to the UE; determining first secondary network measurement configuration for a secondary base station; sending to the secondary base station a dual connectivity configuration request which comprises the first secondary network measurement configuration; and receiving second secondary network measurement configuration and a secondary network measurement gap configured by the secondary base station, wherein the secondary network measurement gap is determined based on the first secondary network measurement configuration and the second secondary network measurement configuration. NR measurement may be executed with a shorter time period of service interruption without changing an LTE baseband circuit of UE.

8 Claims, 7 Drawing Sheets

(51) Int. Cl.
  *G08C 15/00* (2006.01)
  *H04W 24/10* (2009.01)
  *H04W 76/15* (2018.01)
  *H04J 11/00* (2006.01)
  *H04W 36/28* (2009.01)

(58) Field of Classification Search
  USPC .......................................................... 455/434
  See application file for complete search history.

(56) References Cited

U.S. PATENT DOCUMENTS

| | | | |
|---|---|---|---|
| 2015/0208366 A1* | 7/2015 | Papasakellariou .. | H04W 52/244 |
| | | | 370/311 |
| 2015/0373584 A1* | 12/2015 | Hong ................... | H04W 28/08 |
| | | | 370/329 |
| 2016/0036571 A1* | 2/2016 | Park ...................... | H04B 7/024 |
| | | | 370/330 |
| 2016/0050652 A1* | 2/2016 | Wu ........................ | H04L 5/001 |
| | | | 370/329 |
| 2016/0338137 A1* | 11/2016 | Mishra ................. | H04W 36/08 |
| 2017/0086110 A1* | 3/2017 | Wu ................... | H04W 36/0088 |
| 2017/0127397 A1* | 5/2017 | Hahn .................... | H04L 5/0007 |
| 2018/0077596 A1* | 3/2018 | Huang ................. | H04W 24/08 |
| 2018/0083748 A1* | 3/2018 | Tang ...................... | H04L 5/001 |

* cited by examiner

MEASUREMENT CONFIGURING METHOD AND DEVICE FOR DUAL CONNECTIVITY, MEASURING METHOD AND DEVICE FOR DUAL CONNECTIVITY, SCHEDULING METHOD AND DEVICE FOR DUAL CONNECTIVITY, STORAGE MEDIUM, BASE STATION AND TERMINAL

CROSS-REFERENCE TO RELATED APPLICATIONS

The present application claims priority under 35 U.S.C. § 119 to Chinese patent application No. 201710311312.8, filed on May 5, 2017, the entire content of which is incorporated herein by reference.

TECHNICAL FIELD

The present disclosure generally relates to communication technology field, and more particularly, to measurement configuring method and device for dual connectivity, measuring method and device for dual connectivity, scheduling method and device for dual connectivity, a storage medium, a base station and a terminal.

BACKGROUND

In the specification R12 (Release 12) of the Third Generation Partnership Project (3GPP), the concept of dual connectivity is introduced for Long Term Evolution (LTE) technology. That is, two base stations of LTE (for example, evolved Node B, ENB) perform uplink and downlink data transmission with a user equipment (UE) through collaboration. One of the two base stations is a master base station which maintains radio resource control (RRC) signaling of the UE and configures measurement configuration of the UE, and the other base station is a secondary base station which is only responsible for data transmission. When the UE performs inter-frequency measurement, the master base station needs to configure a measurement gap (referred to as GAP hereinafter) for the UE. The UE interrupts communication with all current serving cells during the Gap, to tune its radio frequency (RF) to target inter frequency to be measured and to measure synchronization signals and specific reference signals of neighboring cells at the inter frequency. Therefore, in the dual connectivity of LTE, although the UE generally includes two RF transceivers, the communication between the UE and the master and secondary base stations is interrupted during the GAP, and the UE can perform inter-frequency measurement with any one of the two RF transceivers.

In the recently developed new radio (NR, named as 5G) technology, the concept of LTE-NR dual connectivity (EN DC) is introduced. For example, eNB of LTE serves as the master base station (i.e., master node, MN), gNB of NR serves as the secondary base station (i.e., secondary node, SN), where the gNB as the secondary base station can also configure RRC signaling and exchange RRC signaling directly with the UE. If the master base station and the secondary base station configure their own NR measurement configuration independently, an NR measurement function needs to be added into an LTE baseband circuit of the UE, which is a great change for the UE, and unfavorable to practical applications. Besides, as existing specifications do not specify how the master base station (for example, eNB) and the secondary base station (for example, gNB) cooperate to configure a GAP for the inter-frequency measurement. If the existing solution where the master base station configures the GAP to be applied to all the serving cells is followed, a long period of service interruption may be caused, and communication experience of the UE may be affected.

SUMMARY

By embodiments of the present disclosure, NR measurement may be executed with a shorter time period of service interruption without a change to an LTE baseband circuit of UE.

In an embodiment, a measurement configuring method for dual connectivity is provided, including: after an RRC connection is set up with a UE, a master base station in a master network sending master network measurement configuration to the UE; determining first secondary network measurement configuration for a secondary base station in a secondary network; sending to the secondary base station a dual connectivity configuration request which includes the first secondary network measurement configuration; receiving second secondary network measurement configuration and a secondary network measurement gap configured by the secondary base station, wherein the secondary network measurement gap is determined based on the first secondary network measurement configuration and the second secondary network measurement configuration; and sending the second secondary network measurement configuration and the secondary network measurement gap to the UE.

Optionally, the secondary network measurement gap may be determined based on a time gap required for the UE to execute measurement configured in the first secondary network measurement configuration and the second secondary network measurement configuration.

Optionally, the method may further include: determining a candidate secondary network measurement gap for the secondary base station, wherein the dual connectivity configuration request includes the candidate secondary network measurement gap, and the secondary network measurement gap covers the candidate secondary network measurement gap.

In an embodiment, a measuring method for dual connectivity based on the above measurement configuring method is provided, including: receiving via the master base station the second secondary network measurement configuration and the secondary network measurement gap sent from the secondary base station; sending feedback information to the master base station to complete set up of the dual connectivity; and executing measurement of all secondary network inter-frequencies in the first secondary network measurement configuration and the second secondary network measurement configuration based on a first RF transceiver and/or a second RF transceiver during the secondary network measurement gap, wherein the first RF transceiver and the second RF transceiver have corresponding baseband circuits, respectively.

Optionally, after the RRC connection is set up with the master base station, a master network measurement gap is received from the master base station, and the measuring method further includes: executing measurement of all master network inter-frequencies in the master network measurement configuration based on the first RF transceiver and/or the second RF transceiver during the master network measurement gap.

Optionally, the first RF transceiver and the second RF transceiver are independent from each other, the first RF transceiver serves serving cells of the master network, and the second RF transceiver serves serving cells of the secondary network.

Optionally, executing measurement of all secondary network inter-frequencies in the first secondary network measurement configuration and the second secondary network measurement configuration based on a first RF transceiver and/or a second RF transceiver during the secondary network measurement gap includes: after the dual connectivity is set up, executing measurement of all secondary network inter-frequencies in the first secondary network measurement configuration and the second secondary network measurement configuration using the second RF transceiver during the secondary network measurement gap.

Optionally, the first RF transceiver and the second RF transceiver serve serving cells in the master network and the secondary network cooperatively, and at least one of the first RF transceiver and the second RF transceiver serves the serving cells in one of the master network and the secondary network.

Optionally, the feedback information indicates serving cells served by the first RF transceiver and serving cells served by the second RF transceiver.

Optionally, executing measurement of all secondary network inter-frequencies in the first secondary network measurement configuration and the second secondary network measurement configuration based on a first RF transceiver and/or a second RF transceiver during the secondary network measurement gap includes: after the dual connectivity is set up, executing measurement of all secondary network inter-frequencies in the first secondary network measurement configuration and the second secondary network measurement configuration using the RF transceiver which serves serving cells in the secondary network during the secondary network measurement gap; and executing measurement of all master network inter-frequencies in the master network measurement configuration using the RF transceiver which serves serving cells in the master network during the master network measurement gap.

In an embodiment, a scheduling method for dual connectivity based on the above measurement configuring method is provided, including: receiving feedback information from the UE, wherein the feedback information includes a first group of serving cells whose connection with the UE is interrupted during a master network measurement gap and a second group of serving cells whose connection with the UE is interrupted during the secondary network measurement gap, and the master network measurement gap is determined after the RRC connection is set up; and in response to the feedback information, scheduling the UE in serving cells other than the first group of serving cells during the master network measurement gap, and scheduling the UE in serving cells other than the second group of serving cells during the secondary network measurement gap.

In an embodiment, a measurement configuring device for dual connectivity is provided, being applied in a master base station in a master network and including: a first sending circuitry, configured to: after an RRC connection is set up with a UE, send master network measurement configuration to the UE; a determining circuitry, configured to determine first secondary network measurement configuration for a secondary base station in a secondary network; a second sending circuitry, configured to send to the secondary base station a dual connectivity configuration request which includes the first secondary network measurement configuration; and a first receiving circuitry, configured to receive second secondary network measurement configuration and a secondary network measurement gap configured by the secondary base station, wherein the secondary network measurement gap is determined based on the first secondary network measurement configuration and the second secondary network measurement configuration.

Optionally, the secondary network measurement gap may be determined based on a time gap required for the UE to execute measurement configured in the first secondary network measurement configuration and the second secondary network measurement configuration.

Optionally, the determining circuitry may be further configured to: determine a candidate secondary network measurement gap for the secondary base station, wherein the dual connectivity configuration request includes the candidate secondary network measurement gap, and the secondary network measurement gap covers the candidate secondary network measurement gap.

In an embodiment, a measuring device for dual connectivity based on the above measurement configuring device, including: a second receiving circuitry, configured to receive via the master base station the second secondary network measurement configuration and the secondary network measurement gap sent from the secondary base station; a third sending circuitry, configured to send feedback information to the master base station to complete set up of the dual connectivity; and a first measuring circuitry, configured to execute measurement of all secondary network inter-frequencies in the first secondary network measurement configuration and the second secondary network measurement configuration based on a first RF transceiver and/or a second RF transceiver during the secondary network measurement gap, wherein the first RF transceiver and the second RF transceiver have corresponding baseband circuits, respectively.

Optionally, after the RRC connection is set up with the master base station, a master network measurement gap is received from the master base station, and the measuring device further includes: a second measuring circuitry, configured to execute measurement of all master network inter-frequencies in the master network measurement configuration based on the first RF transceiver and/or the second RF transceiver during the master network measurement gap.

Optionally, the first RF transceiver and the second RF transceiver are independent from each other, the first RF transceiver serves serving cells of the master network, and the second RF transceiver serves serving cells of the secondary network.

Optionally, the first measuring circuitry may include: a first measuring sub-circuitry, configured to: after the dual connectivity is set up, execute measurement of all secondary network inter-frequencies in the first secondary network measurement configuration and the second secondary network measurement configuration using the second RF transceiver during the secondary network measurement gap.

Optionally, the first RF transceiver and the second RF transceiver serve serving cells in the master network and the secondary network cooperatively, and at least one of the first RF transceiver and the second RF transceiver serves the serving cells in one of the master network and the secondary network.

Optionally, the feedback information indicates serving cells served by the first RF transceiver and serving cells served by the second RF transceiver.

Optionally, the first measuring circuitry may further include: a second measuring sub-circuitry, configured to: after the dual connectivity is set up, execute measurement of all secondary network inter-frequencies in the first secondary network measurement configuration and the second secondary network measurement configuration using the RF transceiver which serves serving cells in the secondary network during the secondary network measurement gap; and execute measurement of all master network inter-frequencies in the master network measurement configuration using the RF transceiver which serves serving cells in the master network during the master network measurement gap.

In an embodiment, a scheduling device for dual connectivity based on the above measurement configuring device, including: a third receiving circuitry, configured to receive feedback information from the UE, wherein the feedback information includes a first group of serving cells whose connection with the UE is interrupted during a master network measurement gap and a second group of serving cells whose connection with the UE is interrupted during the secondary network measurement gap, and the master network measurement gap is determined after the RRC connection is set up; and a scheduling circuitry, configured to: in response to the feedback information, schedule the UE in serving cells other than the first group of serving cells during the master network measurement gap, and schedule the UE in serving cells other than the second group of serving cells during the secondary network measurement gap.

In an embodiment, a storage medium which has computer instructions stored therein, wherein once the computer instructions are executed, any one of the above methods is performed.

In an embodiment, a base station including a memory and a processor, wherein the memory has computer instructions stored therein, and once executing the computer instructions, the processor performs the measurement configuring method or the scheduling method.

In an embodiment, a terminal including a memory and a processor, wherein the memory has computer instructions stored therein, and once executing the computer instructions, the processor performs the measuring method.

In embodiments of the present disclosure, after an RRC connection is set up with a UE, a master base station sends master network measurement configuration to the UE, determines first secondary network measurement configuration for a secondary base station, sends to the secondary base station a dual connectivity configuration request which includes the first secondary network measurement configuration, receives second secondary network measurement configuration and a secondary network measurement gap configured by the secondary base station, and sends the second secondary network measurement configuration and the secondary network measurement gap to the UE, where the secondary network measurement gap is determined based on the first secondary network measurement configuration and the second secondary network measurement configuration. Compared with the existing techniques where the master base station configures the GAP to be applied to all the serving cells (serving cells in the master base station and serving cells in the secondary base station), in embodiments of the present disclosure, the master base station configures the master network measurement configuration (may include a master network measurement gap) and selects a secondary base station based on feedback of the UE. Besides, a time gap required for the UE to execute measurement configured in the first secondary network measurement configuration and the second secondary network measurement configuration is determined by the secondary base station. Those skilled in the art can understand that, with the dual connectivity set up in the embodiments of the present disclosure, when executing measurement of all secondary network inter-frequencies in the first secondary network measurement configuration and the second secondary network measurement configuration during the secondary network measurement gap, the UE still keeps communication with the master base station, which may shorten a time period of service interruption during the measurement for inter-frequencies in the secondary network.

Further, if the master base station is an LTE base station (e.g., eNB) and the secondary base station is an NR base station (e.g., gNB), the UE may executing NR measurement based on an NR baseband circuit and an RF receiver of NR without incorporating an NR measurement function into an LTE baseband circuit of the UE. Therefore, embodiments of the present disclosure do not require modifying a circuit structure of a current UE greatly, and are suitable for wide application in practice.

Further, after setting up the RRC connection with the master base station, the UE receives via the master base station the second secondary network measurement configuration and the secondary network measurement gap sent from the secondary base station, sends feedback information to the master base station to complete set up of the dual connectivity (e.g., EN dual connectivity), and executes measurement of all secondary network inter-frequencies in the first secondary network measurement configuration and the second secondary network measurement configuration based on a first RF transceiver and/or a second RF transceiver during the secondary network measurement gap.

Further, the master base station receives the feedback information from the UE, and in response to the feedback information, schedules the UE in serving cells other than the first group of serving cells during the master network measurement gap and schedules the UE in serving cells other than the second group of serving cells during the secondary network measurement gap, so that the UE can be scheduled normally when executing inter-frequency measurement during the master network measurement gap and the secondary network measurement gap configured by the master base station and the secondary base station respectively, which may shorten a time period of service interruption between the master base station and the UE and even avoid the service interruption.

DETAILED DESCRIPTION

Those skilled in the art could understand that, as described in the background, in the LTE dual connectivity based on the existing techniques, when inter-frequency measurement is performed, the UE is disconnected from the master base station and the secondary base station.

The solution is still used for inter-frequency measurement in the LTE-NR dual connectivity (EN DC). Currently, the NR (represented by 5G) standards are still under discussion. For the EN dual connectivity, it is determined to deploy 5G networks in virtue of the LTE network represented by 4G at the first stage, that is, none stand-alone (NSA) networking mode is employed. In the NSA networking mode, the UE is camped in serving cell of a 4G base station (for example, the evolved Node B, eNB). If the UE needs to transmit data with the network, the eNB may first set up a 4G connection with the UE, and then a 5G connection between the UE and a 5G base station (e.g., gNB) is set up with the assistance of the 4G connection, so that the UE can transmit data with the network in a dual connectivity of 4G and 5G After the dual connectivity is set up, the eNB may become the master base station (Master Node, MN) for the UE, and the gNB may become the secondary base station (Secondary Node, SN) for the UE.

Figure 1:
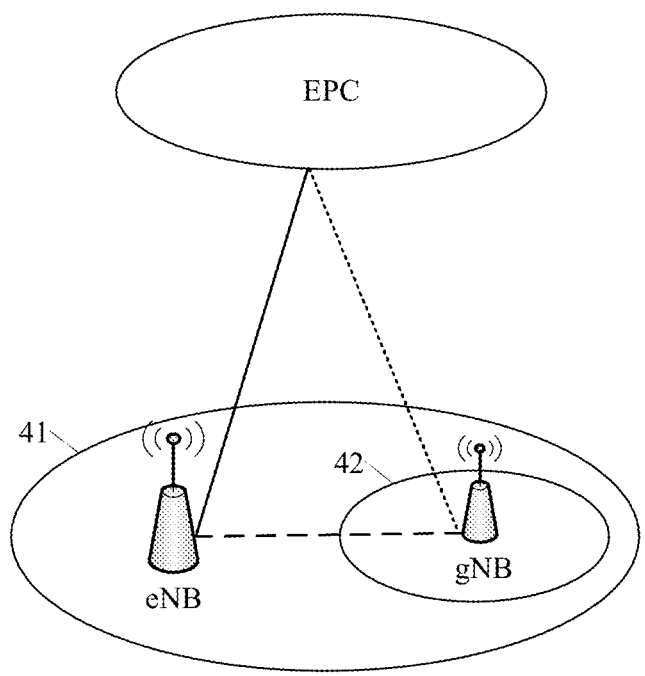
FIG. 1 schematically illustrates a structural diagram of an EN dual connectivity.

Referring to FIG. 1, the coverage of the eNB is shown as a circle 41, and the coverage of the gNB coverage is shown as a circle 42. After the EN dual connectivity is set up, the UE (not shown) can interact information on CP (Control Plane) and UP (User Plane) levels with a core network (evolved packet core, EPC) via the eNB, and the gNB can also interact information on the CP and UP levels with the eNB. The UE may interact information on the UP level with the EPC via the gNB.

Further, the eNB and gNB have corresponding RRC entities linked to the UE, respectively, and configure their own radio measurement configurations (also known as radio resource management measurements) through the corresponding RRC entities. Besides, the eNB serves as the master base station, and the corresponding RRC entity further configures NR-related radio measurement configuration (for example, an NR-related radio measurement gap). Therefore, to configure the NR-related radio measurement configuration, the RRC entities of the eNB and gNB need to cooperate with each other. For example, in the inter-frequency (i.e., frequency different from current serving frequency) measurement, the UE usually needs to have a measurement gap (GAP) to execute the inter-frequency measurement, and during the measurement gap, a base station involved may stop downlink resource scheduling of the UE, so that the UE can switch its RF to required frequency to execute the radio measurement. However, under the EN dual connectivity, the RRC entities of the eNB and gNB need to cooperate with each other to configure the NR radio measurement gap, so that the UE can realize the NR-related radio measurement.

However, the existing standards (or specifications) do not specify how the eNB and gNB (i.e. the master base station and the secondary base station) should cooperate with each other to achieve the NR-related radio measurement configuration. Take an EN dual connectivity as example, where an LTE base station (for example, eNB) serves as a master base station and an NR base station (for example, gNB) serves as a secondary base station. The eNB and gNB may configure their own NR measurement configuration independently for the UE, which can realize the NR radio measurement configuration, but requires a change to circuits. For example, an NR measurement function needs to be incorporated into an LTE baseband circuit of the UE. Besides, during the NR inter-frequency measurement, the UE needs to be disconnected from the eNB and the gNB simultaneously, which may seriously affect service experience of the UE.

Embodiments of the present disclosure provide a configuring solution for an inter-frequency measurement gap, where how a master base station and a secondary base station cooperate with each other is specified, which enables a UE to execute radio measurement related to a network of the secondary base station with a relatively short time period of service interruption.

In embodiments of the present disclosure, after an RRC connection is set up with a UE, a master base station sends master network measurement configuration to the UE, determines first secondary network measurement configuration for a secondary base station, sends to the secondary base station a dual connectivity configuration request which includes the first secondary network measurement configuration, receives second secondary network measurement configuration and a secondary network measurement gap configured by the secondary base station, and sends the second secondary network measurement configuration and the secondary network measurement gap to the UE, where the secondary network measurement gap is determined based on the first secondary network measurement configuration and the second secondary network measurement configuration.

Those skilled in the art can understand that, in embodiments of the present disclosure, the master base station configures the master network measurement configuration (may include a master network measurement gap, e.g., LTE measurement GAP if the master base station is LTE eNB) and selects a secondary base station based on feedback of the UE. Besides, a time gap required for the UE to execute measurement configured in the first secondary network measurement configuration and the second secondary network measurement configuration is determined by the secondary base station. Those skilled in the art can understand that, with the dual connectivity set up in the embodiments of the present disclosure, when executing measurement of all secondary network inter-frequencies in the first secondary network measurement configuration and the second secondary network measurement configuration during the secondary network measurement gap, the UE still keeps communication with the master base station, which may shorten a time period of service interruption during the measurement for inter-frequencies in the secondary network.

Further, if the master base station is an LTE base station (e.g., eNB) and the secondary base station is an NR base station (e.g., gNB), the UE may execute NR measurement based on an NR baseband circuit and an RF receiver of NR without incorporating an NR measurement function into an LTE baseband circuit of the UE. Therefore, embodiments of the present disclosure do not require modifying a circuit structure of a current UE greatly, and are suitable for wide application in practice.

Further, after setting up the RRC connection with the master base station, the UE receives via the master base station the second secondary network measurement configuration and the secondary network measurement gap sent from the secondary base station, sends feedback information to the master base station to complete set up of the dual connectivity (e.g., EN dual connectivity), and executes measurement of all secondary network inter-frequencies in the first secondary network measurement configuration and the second secondary network measurement configuration based on a first RF transceiver and/or a second RF transceiver during the secondary network measurement gap.

Further, the master base station receives the feedback information from the UE. In response to the feedback information, the UE may be scheduled in serving cells whose communication with the UE is still maintained (i.e., serving cells in the secondary network) other than the serving cells whose communication with the UE is interrupted (i.e., serving cells in the master network) during the master network measurement gap, and be scheduled in serving cells whose communication with the UE is still maintained (i.e., serving cells in the master network) other than the serving cells whose communication with the UE is interrupted (i.e., serving cells in the secondary network) during the secondary network measurement gap, so that the UE can be scheduled normally when executing inter-frequency measurement during the master network measurement gap and the secondary network measurement gap configured by the master base station and the secondary base station respectively, which may shorten a time period of service interruption between the master base station and the UE and even avoid the service interruption.

In order to clarify the object, solutions and advantages of embodiments of the present disclosure, embodiments of present disclosure will be described clearly in detail in conjunction with accompanying drawings.

It should be noted that in embodiments of the present disclosure, the master base station in the EN dual connectivity may be eNB, and accordingly, the secondary base station may be gNB; or the master base station in the EN dual connectivity may be gNB, and accordingly the secondary base station may be eNB. Currently, as the gNB has not been widely arranged, the eNB may preferably serve as the master base station in the EN dual connectivity, and the gNB serves as the secondary base station in the EN dual connectivity, which is taken as an example to be described in detail in below embodiments of the present disclosure. By embodiments of the present disclosure, NR inter-frequency measurement may be executed with a shorter time period of service interruption without a change to an LTE baseband circuit of UE. It could be understood that, the present disclosure is not limited thereto. For example, the gNB may serve as the master base station, and the eNB may serve as the secondary base station; or a 3G/2G base station may serve as the master base station, and the gNB may serve as the secondary base station. The embodiments of the present disclosure may be even applied to other radio access technologies in the future. More embodiments may be acquired according to practical requirements by those skilled in the art, and are not described in detail here.

Further, the master base station may be eNB, or other base station in an LTE network, and the secondary base station may be gNB, or other base station in an NR network.

Figure 2:
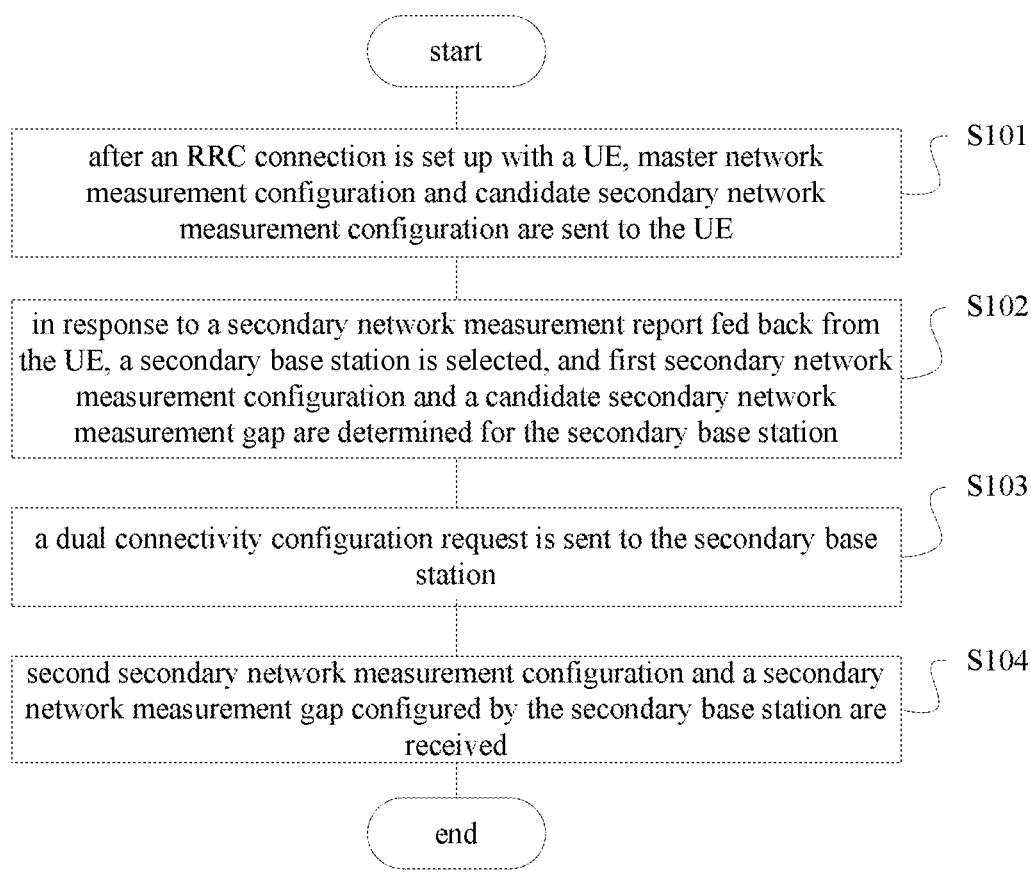
FIG. 2 schematically illustrates a flow chart of a measurement configuring method for dual connectivity according to an embodiment.

FIG. 2 schematically illustrates a flow chart of a measurement configuring method for dual connectivity according to an embodiment. The dual connectivity may be an EN dual connectivity, or other dual connectivity between two base stations employing different radio access technologies. In the embodiment, a measurement configuration procedure during set up of the EN dual connectivity is described from a master base station (in a master network) aspect.

The measurement configuring method may include S101, S102, S103 and S104.

In S101, after an RRC connection is set up with a UE, master network measurement configuration and candidate secondary network measurement configuration are sent to the UE.

In S102, in response to a secondary network measurement report fed back from the UE, a secondary base station in a secondary network is selected, and first secondary network measurement configuration and a candidate secondary network measurement gap are determined for the secondary base station, wherein the secondary network measurement report is obtained from the UE based on the candidate secondary network measurement configuration.

In S103, a dual connectivity configuration request is sent to the secondary base station, wherein the dual connectivity configuration request includes the first secondary network measurement configuration and the candidate secondary network measurement gap.

In S104, second secondary network measurement configuration and a secondary network measurement gap configured by the secondary base station are received, wherein the secondary network measurement gap is determined based on a time gap required for the UE to execute measurement configured in the first secondary network measurement configuration and the second secondary network measurement configuration, and may cover the candidate secondary network measurement gap.

In some embodiments, the master network may be an LTE network (for example, 4G network), and eNB serves as the master base station for the UE; the secondary network may be an NR network (for example, 5G network), and gNB serves as the secondary base station for the UE.

In some embodiments, to facilitate implementing, all radio measurement related to the secondary network may be implemented on an NR-related circuit (such as an NR baseband circuit) of the UE, and all the radio measurement related to the secondary network may include NR-related radio measurement configuration configured by the eNB, and NR-related radio measurement configuration configured by the gNB.

In some embodiments, the master network measurement configuration may include a master network measurement gap. When the master network is an LTE network, the master network measurement configuration may be LTE measurement configuration, the master network measurement gap may be an LTE measurement gap (hereinafter referred to as GAP_L). In some embodiments, the UE may use the GAP_L to execute measurement of all LTE inter-frequencies in the LTE measurement configuration.

In some embodiments, the candidate secondary network measurement configuration may include measurement configuration of multiple candidate secondary network frequencies, wherein the measurement configuration of each candidate secondary network frequency may include measurement objects, a reporting condition and reporting configuration, and each measurement object corresponds to a measurement frequency. Those skilled in the art can understand that a connection with the secondary network has not been set up when S101 is performed. That is, the connection between the master base station and the secondary base station is empty (the master base station has not configured the candidate secondary network measurement gap) for the UE. The master base station may indicate multiple measurement objects to the UE. During execution of measurement by the UE, if neighboring cells in one of the measurement objects meet the reporting condition, the UE shall report the measurement report to the master base station, based on which the master base station determines secondary network frequency where the UE finds a strongest signal from one neighboring cell. In this way, the EN dual connectivity between the master base station and the secondary base station operating at the secondary network frequency can be set up for the UE.

In some embodiments, after the RRC connection is set up, the UE may report UE capability to the master base station, where the UE capability includes RF capability of the UE which indicates the number of radio access technologies that an RF transceiver of the UE can serve and a frequency range of the RF transceiver (for example, the frequency range of the RF transceiver is a low frequency band or a high frequency band, wherein the low frequency band may be within a range below 6 GHz, and the high frequency band may be within a range above 6 GHz). Further, after receiving the RF capability reported by the UE, the master base station may select the secondary base station (i.e. the measurement target) based on the UE measurement report and the UE capability. In some embodiments, the master base station may select multiple secondary network frequencies for the UE and generate corresponding candidate secondary network measurement configuration, so that the UE may report most suitable one from the multiple secondary network frequencies to the master base station for setting up the EN dual connectivity.

Further, in S102, the master base station receives the secondary network measurement report fed back (reported) from the UE, and determines whether to set up the EN dual connectivity for the UE based on the secondary network measurement report. In some embodiments, the eNB may determine whether to set up the EN dual connectivity based on factors, such as signal quality of cells belonging to the gNB, a load of the gNB, or the service requirement to set up the EN dual connectivity for the UE (for example, based on a baud rate requirement required by data transmission of the UE), In some embodiments, when the eNB determines that the EN dual connectivity needs to be set up, the gNB involved in the secondary network measurement report is selected as the secondary base station. Besides, to maintain the EN dual connectivity, the eNB needs to configure the first secondary network measurement configuration and the candidate secondary network measurement gap (GAP) for the gNB.

In some embodiments, during the set up of the EN dual connectivity, a gNB may be selected as the secondary base station. Further, the UE may be configured with a cell group to provide secondary network services. For example, the cell group may provide services for the UE by carrier aggregation.

In some embodiments, in S103, the eNB as the master base station may send the dual connectivity configuration request (SgNB Addition Request) to the gNB as the secondary base station via an Xn interface, to indicate to the gNB the first secondary network measurement configuration and GAP information configured for the UE by the eNB. The GAP information may include a period of the GAP and a starting position within the period. The Xn interface may be an interface (a software interface) between the eNB and the gNB.

In some embodiments, the gNB configures a secondary cell group (SCG) for the current EN dual connectivity based on the dual connectivity configuration request, to determine NR serving cells (SCG cells) that serve the UE based on the gNB. The gNB further configures the second secondary network measurement configuration (i.e. the second NR measurement configuration) and the secondary network measurement gap (i.e., the GAP_N) for the UE. The second NR measurement configuration may include NR measurement frequency, corresponding reporting conditions and so on.

In some embodiments, the first secondary network measurement configuration and the second secondary network measurement configuration may be the same secondary network frequency. For example, the first NR measurement configuration may include the same NR measurement frequency as the second NR measurement configuration. Alternatively, the first secondary network measurement configuration and the second secondary network measurement configuration may include different secondary network frequencies. For example, based on the existing specifications, the eNB does not determine serving frequency of the gNB for the UE, that is, NR measurement frequency included in the first NR measurement configuration should not be the serving frequency of the gNB, while other inter-frequency may be configured by the eNB and the gNB in the first NR measurement configuration and the second NR measurement configuration.

In some embodiments, the GAP_N and GAP_L may be different. For example, a period of the GAP_N and a starting position of the period may be different from a period of the GAP_L and a starting position of the period respectively.

In some embodiments, in S104, the eNB as the master base station may receive via dual connectivity configuration response the second secondary network measurement configuration and the GAP_N configured by the gNB as the secondary base station, so as to complete the measurement configuration of the EN dual connectivity.

Those skilled in the art could understand that, in embodiments of the present disclosure, three measurement gaps are introduced, GAP_L, GAP and GAP_N. The GAP_L is a measurement gap required for the UE to measure LTE inter-frequencies configured by the eNB, the GAP is a measurement gap required for the UE to measure NR inter-frequencies configured by the eNB before the EN dual connectivity is set up, and the GAP_N is a measurement gap required for the UE to measure NR inter-frequencies configured by the gNB (the GAP_N may need to cover the GAP).

In some embodiments, when S104 is performed, the EN dual connectivity is not yet completed. Therefore, the gNB needs to transmit the second secondary network measurement configuration and the GAP_N to the eNB, and the eNB forwards the second secondary network measurement configuration and the GAP_N to the UE. After the EN dual connectivity is set up, the UE may execute measurement of all the LTE inter-frequencies in the master network measurement configuration using the GAP_L configured by the eNB, and execute measurement of all the NR inter-frequencies in the first secondary network measurement configuration and the second secondary network measurement configuration using the GAP_N configured by the gNB.

Those skilled in the art could understand that, in the existing techniques, after the GAP is determined, the UE executes measurement of all the NR inter-frequencies in the first secondary network measurement configuration (the first NR measurement configuration) using the GAP configured by the eNB, which requires an NR measurement function to be incorporated into the LTE baseband circuit of the UE. Therefore, the existing techniques are unfavorable to practical applications.

However, in embodiments of the present disclosure, the GAP configured by the eNB is not used by the UE based on the LTE baseband circuit directly. Instead, the eNB sends the GAP to the gNB, the gNB configures the secondary network measurement gap (GAP_N) based on the GAP, and the eNB sends the GAP_N to the UE. In this way, the UE may execute the measurement of all the NR inter-frequencies in the first secondary network measurement configuration configured by the eNB and the second secondary network measurement configuration configured by the gNB using the GAP_N based on an RF transceiver with an NR baseband circuit. Based on such a solution, only the NR baseband circuit needs to be provided in the UE to implement the NR related measurement, which is simple for operation and does not require any improvement to the existing LTE circuits of the UE.

Figure 3:
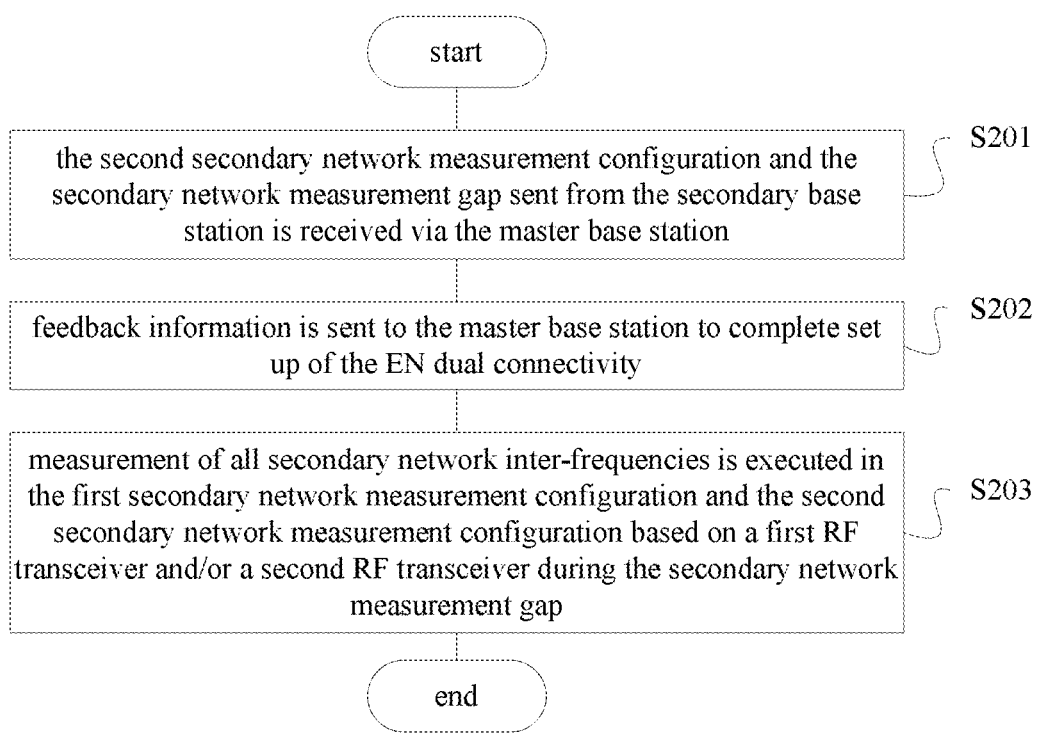
FIG. 3 schematically illustrates a flow chart of a measuring method based on the measurement configuring method for dual connectivity as shown in FIG. 2.

FIG. 3 schematically illustrates a flow chart of a measuring method based on the measurement configuring method for dual connectivity as shown in FIG. 2. The measuring method is applied in the UE. A procedure of the UE executing measurement of NR inter-frequencies and LTE inter-frequencies based on the GAP_N and the GAP_L respectively configured in the above measurement configuring method as shown in FIG. 2 after the EN dual connectivity is set up is described in the measuring method.

The measuring method may include S201, S202 and S203.

In S201, the second secondary network measurement configuration and the secondary network measurement gap sent from the secondary base station is received via the master base station.

In S202, feedback information is sent to the master base station to complete set up of the EN dual connectivity.

In S203, measurement of all secondary network inter-frequencies is executed in the first secondary network measurement configuration and the second secondary network measurement configuration based on a first RF transceiver and/or a second RF transceiver during the secondary network measurement gap, wherein the first RF transceiver and the second RF transceiver have corresponding baseband circuits, respectively.

In below embodiments, the eNB serves as the master base station for the UE, and the gNB serves as the secondary base station for the UE.

In some embodiments, the eNB may send to the UE the second secondary network measurement configuration and the secondary network measurement gap (the GAP_N in the method as shown in FIG. 2) configured by the gNB through an RRC signaling. In some embodiments, the RRC signaling may be an RRC connection reconfiguration signaling.

In some embodiments, the feedback information may be an RRC connection reconfiguration completion signaling. In some embodiments, after S201 is performed, the UE initiates a random access process to access the gNB to set up the EN dual connectivity and, after successfully accessing the gNB, sends the RRC connection reconfiguration completion signaling to the eNB to complete the set up of the EN dual connectivity.

In some embodiments, the UE may include at least two RF transceivers. For example, the UE may include two RF transceivers, a first RF transceiver (hereinafter referred to as RF1) and a second RF transceiver (hereinafter referred to as RF2).

In some embodiments, the RF transceiver may only serve one type of wireless access technology. For example, the RF1 serves serving cells in the LTE network (Master Cell Group Cells, referred to as MCG Cells), and the RF2 serves serving cells in the NR network, and the RF1 and RF2 are independent from each other. The RF1 has a corresponding LTE baseband circuit, and the RF2 has a corresponding NR baseband circuit. Accordingly, S203 may include: executing measurement of all secondary network inter-frequencies in the first secondary network measurement configuration and the second secondary network measurement configuration using the second RF transceiver (i.e., RF2) during the secondary network measurement gap.

For example, after the EN dual connectivity is set up, the UE may execute measurement of all secondary network inter-frequencies (i.e., NR frequencies to be measured in configurations other than the frequency which the SCG cells are located at) in the first secondary network measurement configuration and the second secondary network measurement configuration using the RF2.

In some embodiments, the UE may interrupt the communication with the gNB during the GAP_N to tune frequency of the RF2 to measure all the NR inter-frequencies. Accordingly, the gNB does not schedule the UE during the GAP_N.

In some embodiments, during setting up the RRC connection with the master network, the UE may indicate in the reported RF capability the number of radio access technologies that an RF transceiver of the UE can serve simultaneously.

In some embodiments, the UE receives the master network measurement gap (i.e., the GAP_L in the method as shown in FIG. 2) from the master base station after the RRC connection is set up with the master base station. Accordingly, the measuring method further includes: executing measurement of all master network inter-frequencies (i.e., LTE inter-frequencies) in the master network measurement configuration based on the first RF transceiver (RF1) during the GAP_L. In some embodiments, the step of receiving the master network measurement gap from the master base station may be performed after S101 in the method as shown in FIG. 2.

Those skilled in the art could understand that, in some embodiments, during the measurement of all the NR inter-frequencies in the first secondary network measurement configuration and the second secondary network measurement configuration, the UE disconnects only the communication with the gNB and still keep communication with the eNB, which may effectively shorten a time period of service interruption of the UE. Further, when the eNB is not configured with the GAP_L, or when the GAP_L and the GAP_N do not overlap, during the GAP_N, the eNB may still communicate with the UE, which may definitely avoid service interruption of the UE.

Figure 4:
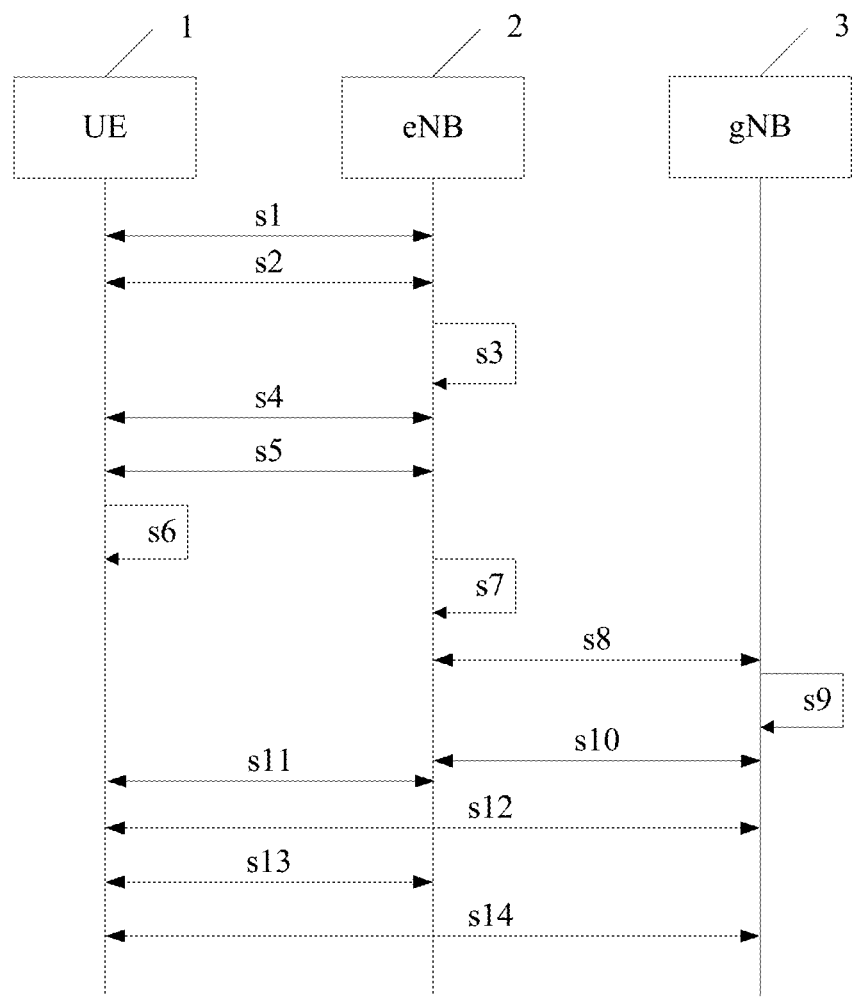
FIG. 4 schematically illustrates a diagram of signaling interaction in a typical application scene according to an embodiment.

FIG. 4 schematically illustrates signaling interaction among the UE, the eNB and the gNB in a typical application scene according to an embodiment.

Referring to FIG. 4, the UE 1 performs s1 to set up an RRC connection with the eNB 2. The UE 1 further performs s2 to report UE capability of the UE 1 to the eNB 2. For example, the UE capability indicates that the UE 1 includes two RF receivers (RF1 and RF2) independent from each other, the RF1 serves the MCG cells, and the RF2 serves the SCG cells. In some embodiments, s2 may be performed along with s1.

Still referring to FIG. 4, the eNB 2 performs s3 to configure master network measurement configuration (LTE measurement configuration), a master network measurement gap (GAP_L) and candidate secondary network measurement configuration for the UE 1. The eNB 2 further performs s4 to send to the UE 1 the LTE measurement configuration, the GAP_L and the candidate secondary network measurement configuration.

After receiving the LTE measurement configuration, the GAP_L and the candidate secondary network measurement configuration from the eNB2, the UE 1 may perform s5 to obtain the secondary network measurement report (NR measurement report) based on the candidate secondary network measurement configuration and report the secondary network measurement report to the eNB 2.

In some embodiments, when the GAP_L configured by the eNB2 comes, the UE 1 may further perform s6 to execute measurement of all the LTE inter-frequencies in the LTE measurement configuration based on the GAP_L.

In some embodiments, after receiving the NR measurement report from the UE 1, the eNB 2 performs s7 to select the gNB 3 to set up the EN dual connectivity based on the NR measurement report, and determine first secondary network measurement configuration (first NR measurement configuration) and a candidate secondary network measurement gap (GAP) for the gNB3. Afterward, the eNB 2 performs s8 to send a dual connectivity configuration request to the gNB 3 based on an Xn interface between the eNB 2 and the gNB 3, where the dual connectivity configuration request includes the first NR measurement configuration and the GAP configured by the eNB 2.

Afterward, the gNB 3 performs s9 to configure SCG Cells for the dual connectivity based on the dual connectivity configuration request, and configure second secondary network measurement configuration (second NR measurement configuration) and a secondary network measurement gap (GAP_N) for the UE 1.

Afterward, the gNB 3 performs s10 to send the SCG Cells, the second NR measurement configuration and the GAP_N to the eNB 2 through dual connectivity configuration response.

After receiving the dual connectivity configuration response, the eNB 2 performs s11 to send configuration information configured by the gNB 3 to the UE 1 through an RRC signaling (such as an RRC connection reconfiguration signaling), wherein the configuration information includes the SCG Cells, the second NR measurement configuration and the GAP_N.

After receiving the RRC signaling, the UE 1 performs s12 to initiate a random access process to access the gNB 3. After a successful access, the UE 1 further performs s13 to send an RRC connection reconfiguration completion signaling to the eNB 2, so as to complete the set up of the EN dual connectivity.

Afterward, when the GAP_N configured by the gNB 3 comes, the UE 1 performs s14 to tune frequency of the RF2 to execute measurement of all the NR inter-frequencies in the first NR measurement configuration and the second NR measurement configuration during the GAP_N (as the GAP_N covers the GAP).

In some embodiments, the RF receiver may serve multiple types of radio access technologies simultaneously. In some embodiments, the RF1 and the RF2 are low frequency RF receivers. The RF1 and the RF2 serve serving cells in the master network (LTE network) and the secondary network (NR network) cooperatively, and at least one of the first RF transceiver and the second RF transceiver serves the serving cells in one of the master network and the secondary network.

For example, the RF1 may serve a portion of the MCG cells and a portion of the SCG cells, and the RF2 may serve remained MCG cells and remained SCG cells. For another example, the RF1 may serve all of the MCG cells and a portion of the SCG cells, and the RF2 may serve remained SCG cells. For another example, the RF1 may serve a portion of the MCG cells and all the SCG cells, and the RF2 may serve remained MCG cells. The RF1 may have an LTE baseband circuit and an NR baseband circuit, and the RF2 may also have an LTE baseband circuit and an NR baseband circuit. Accordingly, S203 may include: executing measurement of all secondary network inter-frequencies in the first secondary network measurement configuration and the second secondary network measurement configuration based on the first RF transceiver (RF1) and the second RF transceiver (RF2) during the secondary network measurement gap.

In some embodiments, the UE may indicate serving cells served by the RF1 and the RF2 respectively in the feedback information. After the EN dual connectivity is set up, the UE may execute measurement of all the NR inter-frequencies in the first NR measurement configuration and the second NR measurement configuration using the transceiver of the serving cells (SCG cells) which serve the NR network during the NR measurement gap, and execute measurement of all the LTE inter-frequencies in the LTE measurement configuration using the transceiver of the serving cells (MCG cells) which serve the LTE network during the LTE measurement gap.

Figure 5:
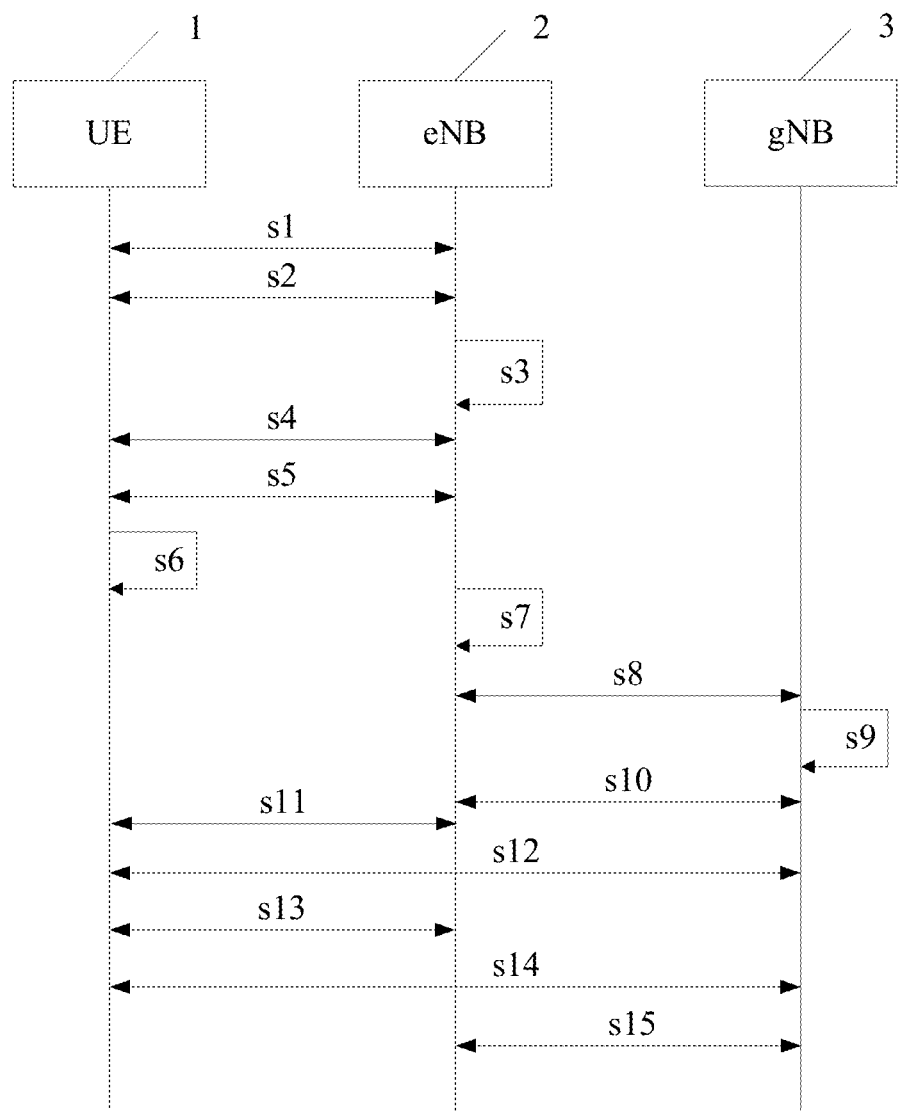
FIG. 5 schematically illustrates a diagram of signaling interaction in another typical application scene according to an embodiment.

FIG. 5 schematically illustrates signaling interaction among the UE, the eNB and the gNB in a typical application scene according to another embodiment.

FIG. 5 is similar with FIG. 4. The UE 1 also performs s1 to set up the RRC connection with the eNB2, and further performs s2 to report to the eNB 2 the UE capability of the UE 1. In some embodiments, the UE capability may indicate that the two RF transceivers (RF 1 and RF2) of the UE 1 serve all the serving cells in the master network (LTE network) and the secondary network (NR network) cooperatively, and at least one of the RF1 and the RF2 serves the serving cells in one of the master network and the secondary network. In some embodiments, s2 may be performed along with s1.

More information about s2 to s13 in FIG. 5 can be found in the above description of s2 to s13 in the signaling interaction process as shown in FIG. 4, and is not described in detail here.

A difference between the signaling interaction in FIG. 5 and the signaling interaction in FIG. 4 lies in that, the gNB3 does not know how the RF1 and RF2 of the UE 1 serve the serving cells in the MCG cells and SCG cells cooperatively. Therefore, it is unknown for the gNB 3 which serving cells are affected when the UE 1 performs the measurement of NR inter-frequencies during the GAP_N (i.e., the gNB 3 does not know which serving cells in the SCG cells need to keep out the GAP_N when scheduling the UE 1 uplink and downlink).

Similarly, the eNB 2 also does not know how the RF1 and RF2 of the UE 1 serve the serving cells in the MCG cells and SCG cells cooperatively. Therefore, it is unknown for the eNB 2 which serving cells are affected when the UE 1 performs the measurement of LTE inter-frequencies during the GAP_L (i.e., the eNB 2 does not know which serving cells in the MCG cells need to keep out the GAP_L when scheduling the UE 1 uplink and downlink).

Therefore, in some embodiments, when S13 is performed, the UE 1 may indicate, in the RRC connection reconfiguration completion signaling fed back to the eNB 2, the serving cells 1 that may be disconnected from the UE 1 during the GAP_N. In some embodiments, according to the GAP_N indicated by the gNB 3, the UE 1 determines that frequency of the RF1 is tuned during the GAP_N to execute the measurement of all the NR inter-frequencies in the first NR measurement configuration and the second NR measurement configuration. Thus, the UE 1 may indicate the serving cells served by the RF1 in the RRC connection reconfiguration completion signaling. For example, the RF1 serves a cell 1 in the MCG cells and a cell2 in the SCG cells, and the UE 1 may indicate in the RRC connection reconfiguration completion signaling that the cell 1 in the MCG cells and the cell2 in the SCG cells may be affected by the GAP_N.

In some embodiments, when the GAP_N indicated by the gNB 3 comes, the UE 1 may perform S14 to tune the frequency of the RF1 during the GAP_N to execute the measurement of all the NR inter-frequencies in the first NR measurement configuration and the second NR measurement configuration.

In some embodiments, if the RRC connection reconfiguration completion signaling indicates that the cells in the SCG cells may be affected by the GAP_N, the eNB 2 may further perform S15 to inform the gNB 3 that the cell 2 may be affected by the GAP_N.

In some embodiments, as the eNB 2 has already known that the cell 1 in the MCG cells is affected by the GAP_N, the eNB 2 does not schedule the UE 1 during the GAP_N.

Similarly, as the gNB 3 has already known that the cell 2 in the SCG cells is affected by the GAP_N, the gNB 3 does not schedule the UE 1 during the GAP_N.

In some embodiments, according to the GAP_L indicated by the eNB 2, if the UE 1 determines that the frequency of the RF1 is tuned during the GAP_L to execute the measurement of all the LTE inter-frequencies in the LTE measurement configuration, the cells served by the RF1 are indicated in the RRC connection reconfiguration completion signaling. The eNB 2 and/or the gNB 3 do not schedule the UE 1 in the cells served by the RF1 during the GAP_L.

In some embodiments, due to frequency difference, the RF1 may work at low frequencies, and the RF2 may work at high frequencies. As the existing eNB and gNB work at low frequencies, all the cells in MCG cells and SCG cells may be served based on the RF1. Further, in some embodiments, LTE radio measurement configuration and NR radio measurement configuration may be completed based on the RF1 to set up the EN dual connectivity.

Figure 6:
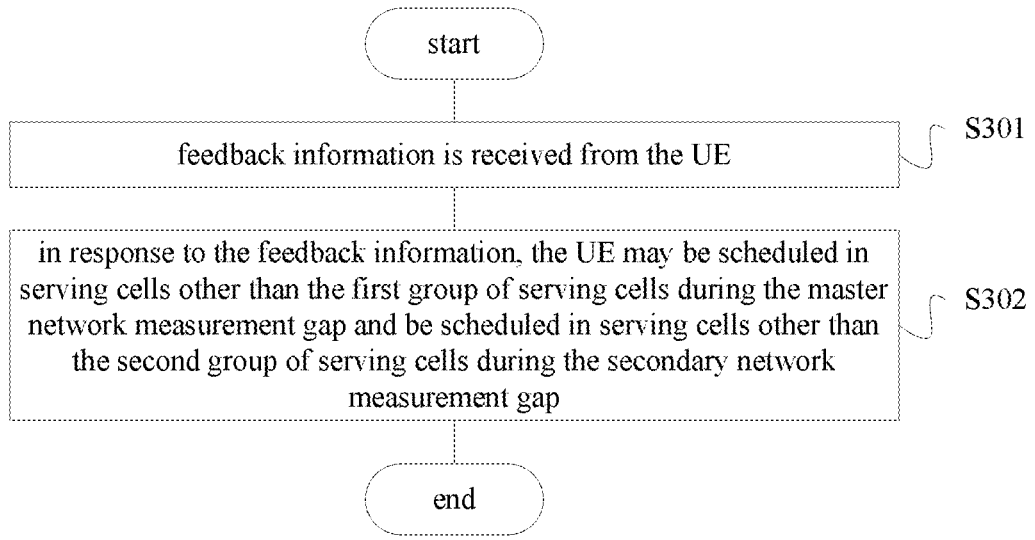
FIG. 6 schematically illustrates a flow chart of a scheduling method based on the measurement configuring method for dual connectivity as shown in FIG. 2.

FIG. 6 schematically illustrates a flow chart of a scheduling method based on the measurement configuring method for dual connectivity as shown in FIG. 2. The scheduling method is applied to the master base station. A procedure of scheduling the UE after the EN dual connectivity is set up is described below.

The scheduling method may include S301 and S302.

In S301, feedback information is received from the UE, where the feedback information includes a first group of serving cells whose connection with the UE is interrupted during a master network measurement gap and a second group of serving cells whose connection with the UE is interrupted during the secondary network measurement gap, and the master network measurement gap is determined after the RRC connection is set up.

In S302, in response to the feedback information, the UE may be scheduled in serving cells other than the first group of serving cells during the master network measurement gap and be scheduled in serving cells other than the second group of serving cells during the secondary network measurement gap.

For example, the feedback information indicates that the UE may tune the frequency of the RF1 during the GAP_L to execute the measurement of all the LTE inter-frequencies in the LTE measurement configuration, and also tune the frequency of the RF1 during the GAP_N to execute the measurement of all the NR inter-frequencies in the first NR measurement configuration and the second NR measurement configuration. Furthermore, the feedback information also indicates cells served by the RF1 (for example, a cell3 in the MCG cells and a cell 1 in the SCG cells). Based on the feedback information, the UE 1 may not be scheduled in the cell 3 in the MCG cells during the GAP_L and the GAP_N.

In some embodiments, as the feedback information indicates that the cell 1 in the SCG cells is also affected by the GAP_L and GAP_N, the eNB may send to the gNB the cell 1 in the SCG cells indicated by the feedback information, and the gNB does not schedule the UE on the cell 1 in the SCG cells during the GAP_N.

In some embodiments, as the RF1 is also used to execute the measurement of all the LTE inter-frequencies in the LTE measurement configuration during the GAP_L, the eNB may inform the gNB of the GAP_L to ensure that the gNB does not schedule the UE on the cell 1 in the SCG cells during the GAP_L.

In some embodiments, the feedback information may be the RRC connection reconfiguration completion signaling described in the embodiments as shown in FIG. 4 and FIG. 5.

More information can be found in the above description of FIG. 4 and FIG. 5, and is not described in detail here.

Figure 7:
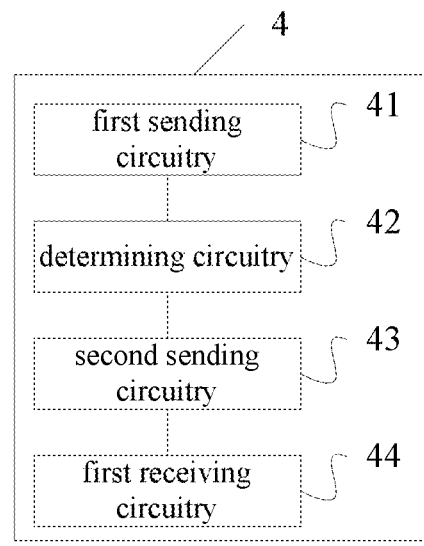
FIG. 7 schematically illustrates a structural diagram of a measurement configuring device for dual connectivity according to an embodiment.

FIG. 7 schematically illustrates a structural diagram of a measurement configuring device for dual connectivity according to an embodiment. Those skilled in the art could understand that, the measurement configuring device 4 may be applied to implement the method as shown in FIG. 2. The measurement configuring device 4 may include: a first sending circuitry 41, configured to: after an RRC connection is set up with a UE, send master network measurement configuration and candidate secondary network measurement configuration to the UE; a determining circuitry 42 configured to: in response to a secondary network measurement report fed back from the UE, select a secondary base station in a secondary network, and determine first secondary network measurement configuration and a candidate secondary network measurement gap for the secondary base station, wherein the secondary network measurement report is obtained by the UE based on the candidate secondary network measurement configuration; a second sending circuitry 43, configured to: send a dual connectivity configuration request to the secondary base station, wherein the dual connectivity configuration request includes the first secondary network measurement configuration and the candidate secondary network measurement gap; and a first receiving circuitry 44, configured to receive second secondary network measurement configuration and a secondary network measurement gap configured by the secondary base station, wherein the secondary network measurement gap is determined based on a time gap required for the UE to execute measurement configured in the first secondary network measurement configuration and the second secondary network measurement configuration, and covers the candidate secondary network measurement gap.

Figure 8:
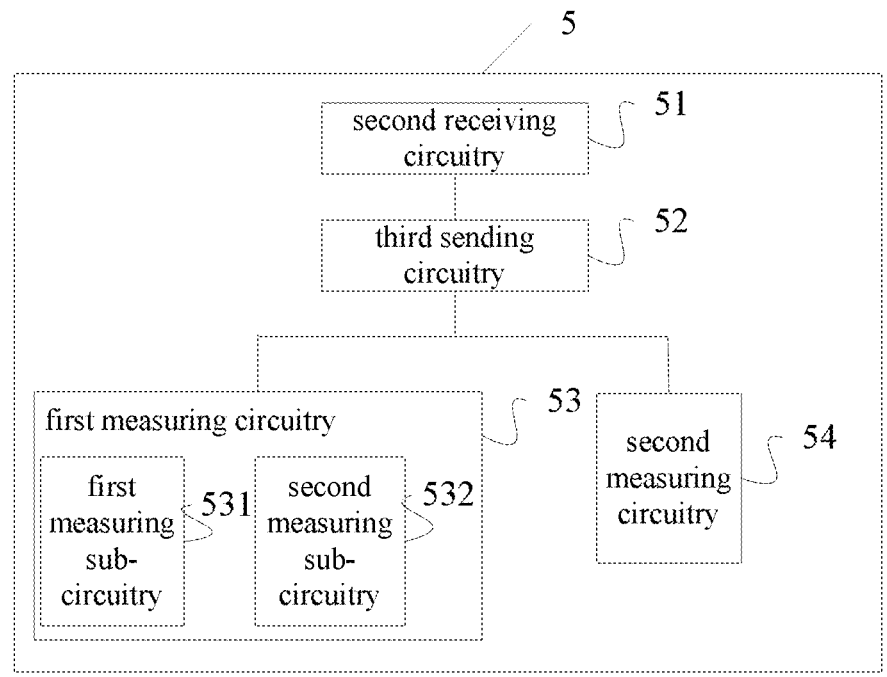
FIG. 8 schematically illustrates a structural diagram of a measuring device based on the measurement configuring device for dual connectivity as shown in FIG. 7.

FIG. 8 schematically illustrates a structural diagram of a measuring device based on the measurement configuring device for dual connectivity as shown in FIG. 7. Those skilled in the art could understand that, the measuring device 5 may be applied to implement the method as shown in FIG. 3 to FIG. 5. The measuring device 5 may include: a second receiving circuitry 51, configured to receive via the master base station the second secondary network measurement configuration and the secondary network measurement gap sent from the secondary base station; a third sending circuitry 52, configured to send feedback information to the master base station to complete set up of the EN dual connectivity; and a first measuring circuitry 53, configured to execute measurement of all secondary network inter-frequencies in the first secondary network measurement configuration and the second secondary network measurement configuration based on a first RF transceiver and/or a second RF transceiver during the secondary network measurement gap, wherein the first RF transceiver and the second RF transceiver have corresponding baseband circuits, respectively.

In some embodiments, after the RRC connection is set up with the master base station, a master network measurement gap is received from the master base station, and the measuring device 5 further includes a second measuring circuitry 54, configured to execute measurement of all master network inter-frequencies in the master network measurement configuration based on the first RF transceiver and/or the second RF transceiver during the master network measurement gap.

In some embodiments, the first RF transceiver and the second RF transceiver are independent from each other, the first RF transceiver serves serving cells of the master network, and the second RF transceiver serves serving cells of the secondary network.

In some embodiments, the first measuring circuitry 53 includes: a first measuring sub-circuitry 531, configured to: after the EN dual connectivity is set up, execute measurement of all secondary network inter-frequencies in the first secondary network measurement configuration and the second secondary network measurement configuration using the second RF transceiver during the secondary network measurement gap.

In some embodiments, the first RF transceiver and the second RF transceiver serve serving cells in the master network and the secondary network cooperatively, and at least one of the first RF transceiver and the second RF transceiver serves the serving cells in one of the master network and the secondary network.

In some embodiments, the feedback information indicates serving cells served by the first RF transceiver and serving cells served by the second RF transceiver.

In some embodiments, the first measuring circuitry 53 includes: a second measuring sub-circuitry 532, configured to: after the EN dual connectivity is set up, execute measurement of all secondary network inter-frequencies in the first secondary network measurement configuration and the second secondary network measurement configuration using the RF transceiver which serves serving cells in the secondary network during the secondary network measurement gap; and execute measurement of all master network inter-frequencies in the master network measurement configuration using the RF transceiver which serves serving cells in the master network during the master network measurement gap.

Figure 9:
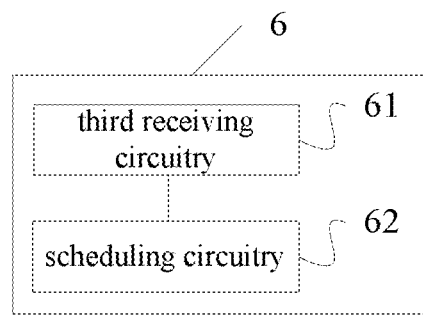
FIG. 9 schematically illustrates a structural diagram of a scheduling device based on the measurement configuring device for dual connectivity as shown in FIG. 7.

FIG. 9 schematically illustrates a structural diagram of a scheduling device based on the measurement configuring device for dual connectivity as shown in FIG. 7. Those skilled in the art could understand that, the scheduling device 6 may be applied to implement the method as shown in FIG. 6. The scheduling device 6 may include: a third receiving circuitry 61, configured to receive feedback information from the UE, wherein the feedback information includes a first group of serving cells whose connection with the UE is interrupted during a master network measurement gap and a second group of serving cells whose connection with the UE is interrupted during the secondary network measurement gap, and the master network measurement gap is determined after the RRC connection is set up; and a scheduling circuitry 62, configured to: in response to the feedback information, schedule the UE in serving cells other than the first group of serving cells during the master network measurement gap and schedule the UE in serving cells other than the second group of serving cells during the secondary network measurement gap.

In some embodiments, the low frequency includes frequencies below 6 KHz, and the high frequency includes frequencies above 6 KHz. However, the present disclosure is not limited thereto. More embodiments may be obtained by those skilled in the art based on practical requirements, and are not described in detail here.

In an embodiment, a storage medium which has computer instructions stored therein is provided, wherein once the computer instructions are executed, the above method provided in embodiments of FIG. 2 to FIG. 6 is performed. Preferably, the storage medium may include a computer readable storage medium, such as a Read-Only Memory (ROM), a Random Access Memory (RAM), a magnetic disk or an optical disk.

In an embodiment, a base station including a memory and a processor is provided, wherein the memory has computer instructions stored therein, and once executing the computer instructions, the processor performs the method provided in embodiments of FIG. 2 and FIG. 4 to FIG. 6. Preferably, the base station may be the master base station.

In an embodiment, a terminal including a memory and a processor is provided, wherein the memory has computer instructions stored therein, and once executing the computer instructions, the processor performs the method provided in embodiments of FIG. 3 to FIG. 5. Preferably, the terminal may be the UE.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A measurement configuring method for dual connectivity, comprising:
   after a Radio Resource Control (RRC) connection is set up with a user equipment (UE), a master base station in a master network sending master network measurement configuration to the UE;
   determining first secondary network measurement configuration for a secondary base station in a secondary network;
   sending to the secondary base station a dual connectivity configuration request which comprises the first secondary network measurement configuration;
   receiving second secondary network measurement configuration and a secondary network measurement gap configured by the secondary base station, wherein the secondary network measurement gap is determined based on the first secondary network measurement configuration and the second secondary network measurement configuration; and
   sending the second secondary network measurement configuration and the secondary network measurement gap to the UE.

2. The method according to claim 1, wherein the secondary network measurement gap is determined based on a time gap required for the UE to execute measurement configured in the first secondary network measurement configuration and the second secondary network measurement configuration.

3. The method according to claim 1, further comprising: determining a candidate secondary network measurement gap for the secondary base station, wherein the dual connectivity configuration request comprises the candidate secondary network measurement gap, and the secondary network measurement gap covers the candidate secondary network measurement gap.

4. A scheduling method for dual connectivity based on the method of claim 1, comprising:
   receiving feedback information from the UE, wherein the feedback information comprises a first group of serving cells whose connection with the UE is interrupted during a master network measurement gap and a second group of serving cells whose connection with the UE is interrupted during the secondary network measurement gap, and the master network measurement gap is determined after the RRC connection is set up; and
   in response to the feedback information, scheduling the UE in serving cells other than the first group of serving cells during the master network measurement gap, and scheduling the UE in serving cells other than the second group of serving cells during the secondary network measurement gap.

5. A measurement configuring device for dual connectivity, being applied in a master base station in a master network and comprising:
   a first sending circuitry, configured to: after a Radio Resource Control (RRC) connection is set up with a user equipment (UE), send master network measurement configuration to the UE;
   a determining circuitry, configured to determine first secondary network measurement configuration for a secondary base station in a secondary network;
   a second sending circuitry, configured to send to the secondary base station a dual connectivity configuration request which comprises the first secondary network measurement configuration; and
   a first receiving circuitry, configured to receive second secondary network measurement configuration and a secondary network measurement gap configured by the secondary base station, wherein the secondary network measurement gap is determined based on the first secondary network measurement configuration and the second secondary network measurement configuration.

6. The device according to claim 5, wherein the secondary network measurement gap is determined based on a time gap required for the UE to execute measurement configured in the first secondary network measurement configuration and the second secondary network measurement configuration.

7. The device according to claim 5, wherein the determining circuitry is further configured to: determine a candidate secondary network measurement gap for the secondary base station, wherein the dual connectivity configuration request comprises the candidate secondary network measurement gap, and the secondary network measurement gap covers the candidate secondary network measurement gap.

8. A scheduling device for dual connectivity based on the device of claim 5, comprising:
   a third receiving circuitry, configured to receive feedback information from the UE, wherein the feedback information comprises a first group of serving cells whose connection with the UE is interrupted during a master network measurement gap and a second group of serving cells whose connection with the UE is interrupted during the secondary network measurement gap, and the master network measurement gap is determined after the RRC connection is set up; and
   a scheduling circuitry, configured to: in response to the feedback information, schedule the UE in serving cells other than the first group of serving cells during the master network measurement gap, and schedule the UE in serving cells other than the second group of serving cells during the secondary network measurement gap.

* * * * *